H. W. CAMPBELL.
CHECKLINE ATTACHMENT.
APPLICATION FILED OCT. 15, 1918.

1,315,703.

Patented Sept. 9, 1919.
2 SHEETS—SHEET 1.

Witnesses

Inventor
HARDY W. CAMPBELL
By his Attorneys

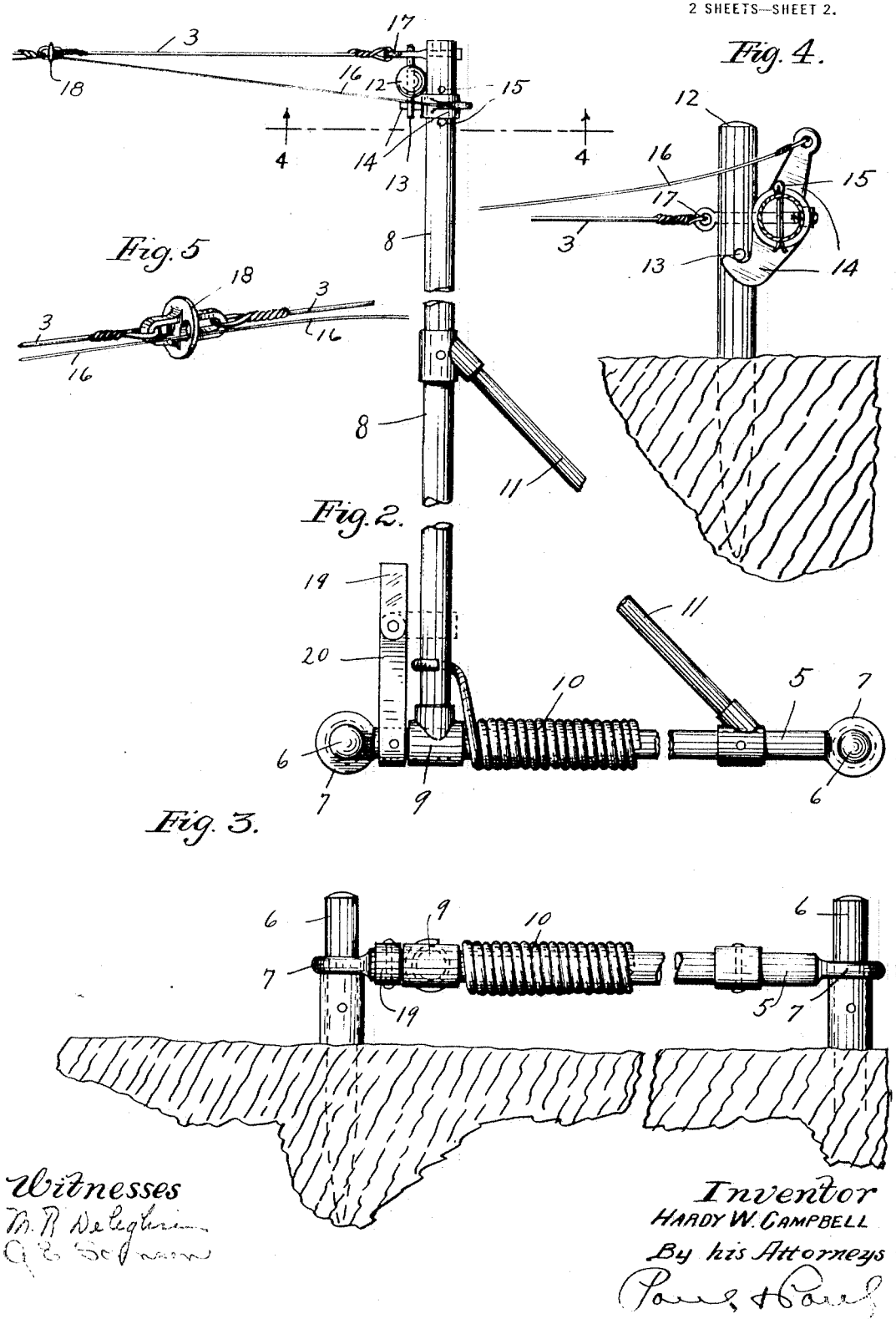

UNITED STATES PATENT OFFICE.

HARDY WEBSTER CAMPBELL, OF LINCOLN, NEBRASKA.

CHECKLINE ATTACHMENT.

1,315,703.  Specification of Letters Patent.  Patented Sept. 9, 1919.

Application filed October 15, 1918. Serial No. 258,233.

*To all whom it may concern:*

Be it known that I, HARDY WEBSTER CAMPBELL, a citizen of the United States, resident of Lincoln, county of Lancaster, State of Nebraska, have invented certain new and useful Improvements in Checkline Attachments, of which the following is a specification.

The object of my invention is to provide a means for using a straight check line and for automatically shifting one end of the check line, whereby the operator of the machine can dispense with a helper, operate a three or more row planter and shift both ends of the check line while stationed with the machine at one end.

A further object is to provide an attachment by the use of which the rows can be checked straighter and with more uniformity then where the check line is oblique or at an angle, such angular arrangement of the line resulting from the lack of an automatic shifting means at one end.

The invention consists generally in various constructions and combinations, all as hereinafter described and particularly pointed out in the claims.

In the accompanying drawings forming part of this specification,

Fig. 2 is a detail view, showing the manner of anchoring the attachment and holding the shifting arm in place, Fig. 3 is a detail view of the shifting arm and anchoring means, Fig. 4 is a detail view of the trip device for releasing the shifting arm, Fig. 5 is a detail view of one of the buttons on the check line.

Figure 1:
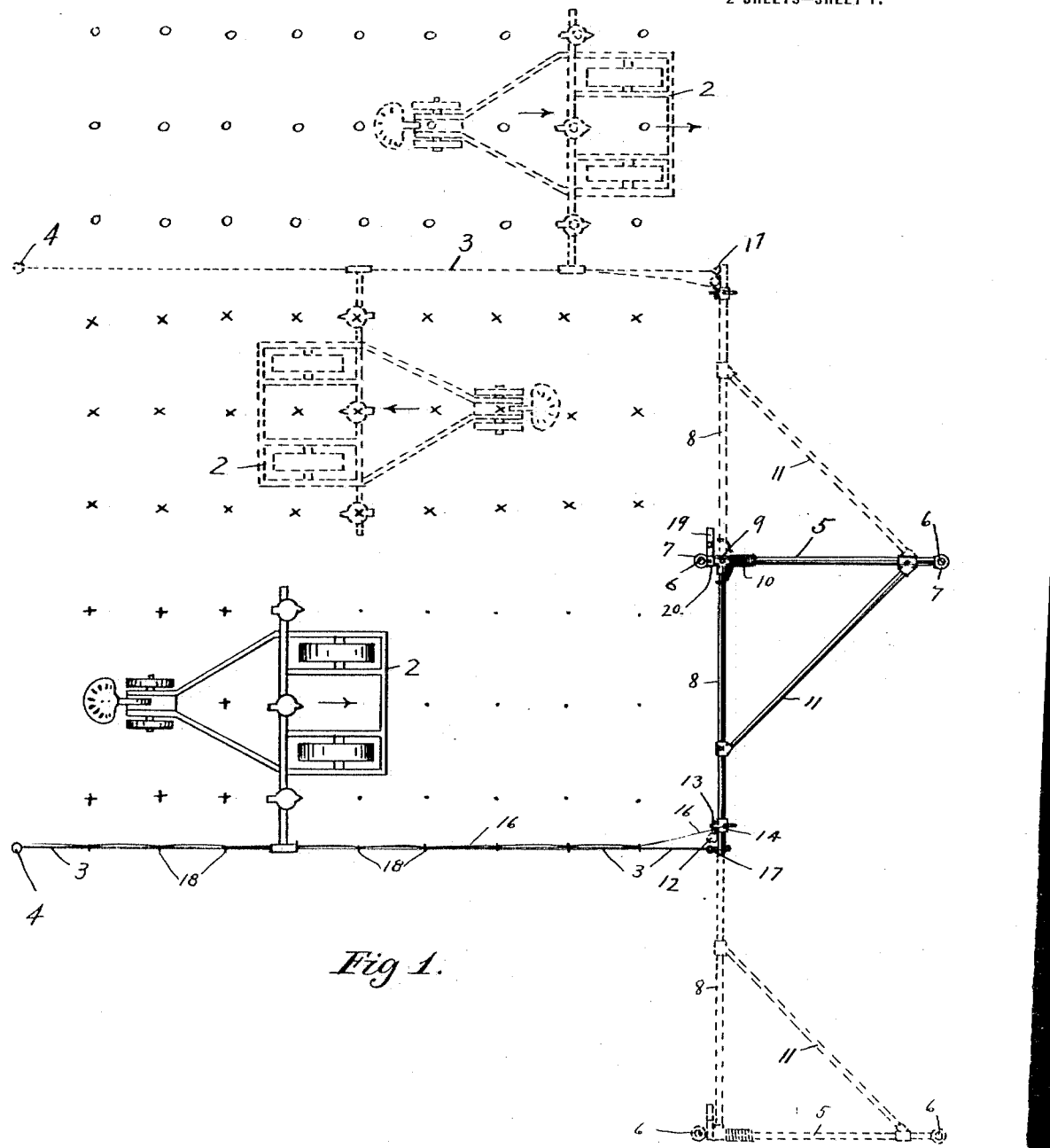
Figure 1 is a diagrammatic view, illustrating my check line attachment in use.

In the drawing, 2 represents a seeder or planter of any suitable type. 3 is a check wire having a stake 4 at one end for holding the wire in place. 5 is a rod placed horizontally upon the ground and secured by means of stakes 6 which pass through loops 7 in said rod. 8 is an arm, preferably of tubing, having a hub 9 on the bar 5 and 10 is a spring coiled on said bar and attached thereto at one end and looped under the arm 8, the tension of said spring normally lifting on said arm to swing it from the dotted line position shown in Fig. 1 to the full line position therein. A suitable brace 11 is provided between the bar 5 and the arm 8. A stake 12 is provided at the outer end of the arm 8 and has a projecting pin 13 and a dog 14 is loosely mounted on the arm 8 between cotter pins 15 in position to engage the pin 13 and normally lock the arm in its depressed horizontal position. The dog is disengaged from the pin 13 by means of the trip line 16. The check line is provided with the usual buttons 18 arranged at predetermined intervals for operating the seed dropping mechanism of the planter or seeder. The trip line 16 passes through a hole in the buttons.

The attachment is shown with a three row planter, but I do not confine myself to this number. Upon the initial movement of the machine, it follows along the check line, planting three rows the desired distance apart and with the desired distance between the hills. The operator then turns the machine and goes back with three rows to the starting point. He then trips the dog 14 by means of the trip line 16 and the arm 8, released, is swung by the tension of its spring to the other side of the bar 5 or from the position shown in dotted lines in Fig. 1 to that illustrated by full lines in said figure. The arm 8 thus released will swing in a vertical plane through 180 degrees of a circle and over six rows of plants and the operator may then drive back to the starting point following the check line which has been swung by the movement of the arm to a position to form a guide for the planter back to the side of the field from which the machine originally started. When this has been done, the bar 5 may be moved with the posts to the position indicated by dotted lines in Fig. 1 and when this is done, the clip 19 mounted on the arm 20 that is carried by the bar 5 is swung to a position over the arm 8 to prevent the arm from being thrown by the spring 10 before the operator is ready to release said arm by the movement of the trip line.

The operation of the planter as described is then repeated and continued thereafter, the swinging arm moving one end of the check line over the rows of plants from one position to the other without hand labor and without the necessity of more than one man to handle the machine and check line, and enables the operator to keep the check line straight or parallel with the preceding row from one end of the row to the other.

I claim as my invention:

1. A check wire attachment comprising a rod having means for fastening it in a horizontal position on the ground, an arm mounted to swing on said rod from one side to the other thereof, means for normally locking said arm on one side of said rod, means for tripping said locking means to allow said arm to swing to the other side of said rod, and a check wire attached at one end to said arm to be shifted thereby.

2. The combination, with a check wire, of means for automatically shifting one end of said wire from one point in the field to another and means for controlling said shifting means from the other end of said check wire.

3. A check wire attachment comprising a rod having means for fastening it horizontally on the ground, an arm mounted to swing thereon, a check wire attached to said arm, a stake driven into the ground and having a pin near said arm, a locking latch carried by said arm to engage said pin, a trip line for releasing said latch and a spring for swinging said arm and check wire from one side of said rod to the other.

4. The combination, with a check wire having buttons thereon and holes in said buttons, of a swinging arm to which one end of said wire is attached, means for locking said arm in a horizontal position on the ground at one side of said locking means, and a trip line passing through said holes and connected to said locking means for tripping it to allow said arm to swing with said check wire to the other side of said locking means.

5. The combination, with a check line, of means for automatically shifting one end of said line from one point in the field to another, and means remote from said end of the line for controlling said shifting means.

In witness whereof, I have hereunto set my hand this 25th day of July, 1918.

HARDY WEBSTER CAMPBELL.